United States Patent
Tomiyama

(10) Patent No.: US 9,356,529 B2
(45) Date of Patent: May 31, 2016

(54) POWER SUPPLY AND IMAGE FORMING APPARATUS

(71) Applicant: CANON KABUSHIKI KAISHA, Tokyo (JP)

(72) Inventor: Masayasu Tomiyama, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 14/149,516

(22) Filed: Jan. 7, 2014

(65) Prior Publication Data

US 2014/0198541 A1    Jul. 17, 2014

(30) Foreign Application Priority Data

Jan. 17, 2013    (JP) ................. 2013-006418

(51) Int. Cl.
*H02M 3/335*    (2006.01)
*G03G 15/00*    (2006.01)
*H02M 1/44*    (2007.01)
*H02M 1/00*    (2006.01)

(52) U.S. Cl.
CPC ........... *H02M 3/33592* (2013.01); *G03G 15/80* (2013.01); *H02M 1/44* (2013.01); *H02M 2001/0032* (2013.01); *Y02B 70/1475* (2013.01); *Y02B 70/16* (2013.01)

(58) Field of Classification Search
CPC ................ H02M 3/33592; H02M 2001/0032; H02M 3/3381; H02M 3/3385; H02M 3/33507; H02M 3/33523
See application file for complete search history.

(56) References Cited

U.S. PATENT DOCUMENTS 6,862,193 B2    3/2005   Nakata
7,023,679 B2    4/2006   Tomiyama
7,123,490 B2 *  10/2006  Amei ................ H02M 3/33561
                                                  363/21.14

FOREIGN PATENT DOCUMENTS

JP    3697218 B2    9/2005

* cited by examiner

*Primary Examiner* — Harry Behm
(74) *Attorney, Agent, or Firm* — Fitzpatrick, Cella, Harper & Scinto

(57) ABSTRACT

The power supply includes a transformer, a first switching element for performing a switching operation of turning on and off a voltage input to a primary side of the transformer, a second switching element to be connected to a secondary side of the transformer so as to be turned on and off in accordance with a voltage generated in the secondary side of the transformer, and a control unit for controlling an operation of the first switching element so that an output voltage of the secondary side of the transformer becomes a predetermined voltage. A conductive state period of the second switching element is adjusted to be longer as a frequency of the switching operation of the first switching element is higher.

13 Claims, 8 Drawing Sheets

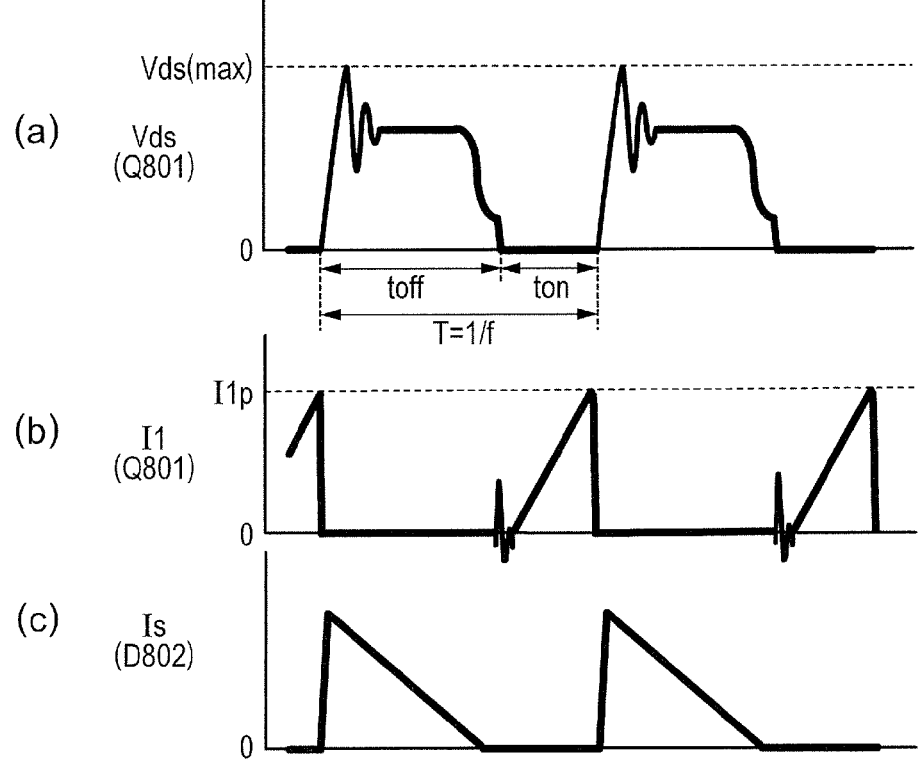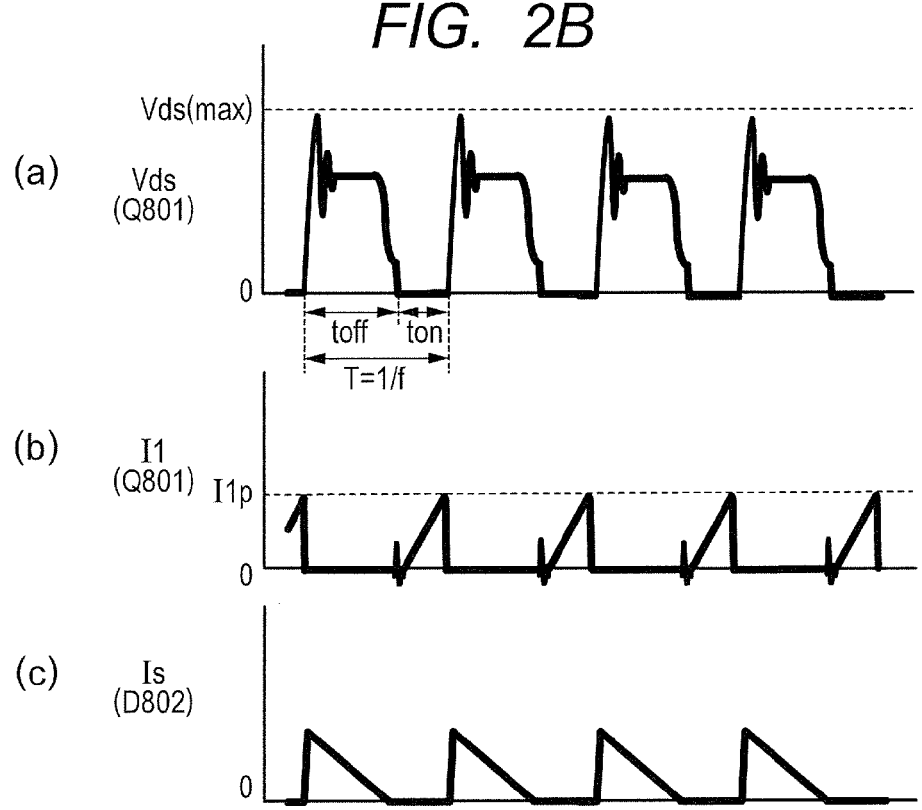

POWER SUPPLY AND IMAGE FORMING APPARATUS

BACKGROUND OF THE INVENTION

1. Field of the Invention

The present invention relates to a power supply and an image forming apparatus. In particular, the present invention relates to a flyback power supply circuit such as a ringing choke converter.

2. Description of the Related Art

In general, a switching power supply such as a flyback converter operating in a discontinuous mode is designed in such a manner that the oscillating frequency becomes minimum at a maximum load state required for the equipment in which the switching power supply is mounted, from a viewpoint of supplying power. Therefore, as the load becomes smaller in a sleep state or the like of the equipment, the oscillating frequency becomes higher. Further, when the oscillating frequency increases, an increase of electro magnetic interference (EMI) such as a noise terminal voltage, deterioration of power conversion efficiency, or other problems occur. In particular, the increase of the noise terminal voltage not only makes a design of a filter circuit for suppressing the noise more complicated but also increases the space occupied by the filter circuit in the apparatus itself, which inhibits downsizing of the equipment. As a measure for solving the problem, for example, Japanese Patent No. 3697218 describes a structure for lowering an operation frequency (oscillating frequency) of the ringing choke converter when the apparatus is in the sleep mode (in a light load state).

However, the related-art switching power supply proposed in Japanese Patent No. 3697218 has a problem in that the oscillating frequency is increased in a light load state of the equipment when an equipment sleep signal is not given. This problem is briefly described below with reference to FIGS. 1A and 1B. Note that, FIGS. 1A and 1B are described in detail in embodiments according to the present invention described later. As the flyback converter operating in the discontinuous mode, there are a switching power supply using diode rectification such as a ringing choke converter (RCC) illustrated in FIG. 1A and a switching power supply using synchronous rectification such as an RCC illustrated in FIG. 1B.

In the diode rectification RCC illustrated in FIG. 1A, a power loss occurs in a rectifying diode D802 on the secondary side due to a forward voltage drop of the rectifying diode D802. On the other hand, the synchronous rectification RCC illustrated in FIG. 1B performs the same operation as the diode rectification RCC while reducing the power loss in the rectifying diode D802 that is generated in the above-mentioned diode rectification RCC. The synchronous rectification RCC can reduce an ON-resistance of a switching element Q1101 in the conductive state so as to reduce a power loss generated in the switching element Q1101 in the conductive state to be smaller than the power loss generated in the diode D802 of the diode rectification RCC. Therefore, the synchronous rectification RCC can improve power conversion efficiency of the switching power supply than the diode rectification RCC.

However, the synchronous rectification RCC still has the problem in that the oscillating frequency is increased in a light load state, similarly to the diode rectification RCC. In addition, because the synchronous rectification RCC has the improved power conversion efficiency compared with the diode rectification RCC, the synchronous rectification RCC causes another problem in that the oscillating frequency is increased when supplying energy to the same load. Further, when the oscillating frequency is increased, noise is also increased.

SUMMARY OF THE INVENTION

In such a circumstance, an object of the present invention is to provide a power supply to enable reducing the oscillating frequency in a light load state so as to reduce noise.

Another object of the present invention is to provide a power supply including a transformer having a primary side and a secondary side which are insulated with each other, a first switching element for effecting a switching operation of switching between an ON state in which a voltage is supplied to the primary side of the transformer and an OFF state in which the voltage is prevented from being supplied to the primary side of the transformer, a second switching element connected to the secondary side of the transformer, for switching between the ON state and the OFF state in accordance with a voltage generated in the secondary side of the transformer, and a control unit for controlling the switching operation of the first switching element so that an output voltage of the secondary side of the transformer becomes a predetermined voltage, wherein a conductive state period of the second switching element is adjusted so that the higher a frequency of the switching operation of the first switching element is, the longer conductive state period of the second switching element.

A further object of the present invention to provide An image forming apparatus, including an image forming unit for forming an image on a recording material; and a power supply for supplying power for an operation of the image forming unit, wherein the power supply includes a transformer having a primary side and a secondary side which are insulated with each other, a first switching element for performing a switching operation of switching between an ON state in which a voltage is supplied to the primary side of the transformer and an OFF state in which the voltage is prevented from being supplied to the primary side of the transformer, a second switching element connected to the secondary side of the transformer for switching the second switching between an ON state and an OFF state in accordance with a voltage generated in the secondary side of the transformer, and a control unit for controlling the switching operation of the first switching element so that an output voltage of the secondary side of the transformer becomes a predetermined voltage, and wherein a conductive state period of the second switching element is adjusted so that the higher a frequency of the switching operation of the first switching element is, the longer conductive state period of the second switching element.

A still further feature of the present invention will become apparent from the following description of exemplary embodiments with reference to the attached drawings.

BRIEF DESCRIPTION OF THE DRAWINGS

FIGS. 2A and 2B are diagrams illustrating operational waveforms of individual portions of the related-art switching power supply for comparing with the embodiments.

DESCRIPTION OF THE EMBODIMENTS

First, there are described a structure and an operation of a related-art flyback converter operating in a discontinuous mode for comparing with embodiments of the present invention described later. Note that, power supplies of the embodiments described later relate to a switching power supply for supplying power to equipment having multiple operation states from a viewpoint of power consumption. In particular, the power supplies relate to a power supply circuit of a system (flyback system such as a ringing choke converter) in which the oscillating frequency is significantly changed depending on power consumed by the equipment.

Basic Operation of Switching Power Supply and Operation Having Problem (Diode Rectification Ringing Choke Converter)

Figure 1A:
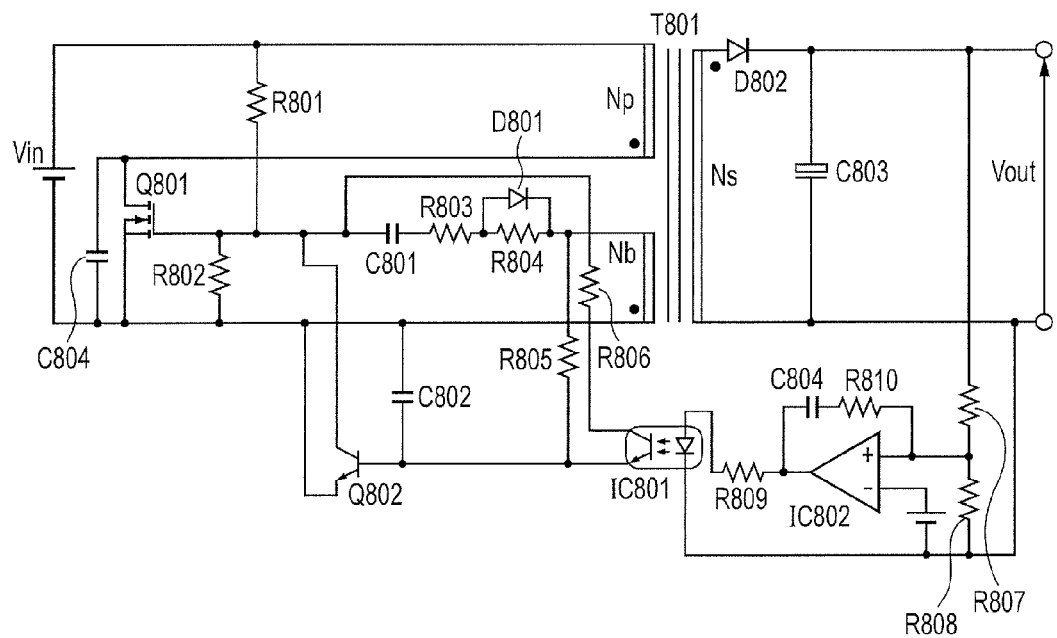
FIGS. 1A and 1B are circuit diagrams illustrating structures of related-art switching power supplies for comparing with embodiments of the present invention.

As the flyback converter operating in the discontinuous mode, a ringing choke converter (hereinafter referred to simply as an RCC) illustrated in FIG. 1A is described as an example. An insulating transformer T801 includes a primary winding $N_p$ on an input side, a secondary winding $N_s$ on an output side, and an auxiliary winding $N_b$ on the primary side. The auxiliary winding $N_b$ is a winding for driving a switching element Q802 for conductive and non-conductive control of a control terminal of a main switching element Q801 as a first switching element. An input voltage $V_{in}$ is a DC voltage obtained by rectifying an AC input voltage by a bridge diode and smoothing by an aluminum electrolytic capacitor, and is a voltage across the terminals of the aluminum electrolytic capacitor. In FIG. 1A, the bridge diode, the aluminum electrolytic capacitor, and an input filter are not illustrated. The input voltage $V_{in}$ is applied between one end of the primary winding $N_p$ and a current output terminal of the main switching element Q801. A positive side of the input voltage $V_{in}$ is connected to the one end of the primary winding $N_p$, and a negative side of the input voltage is connected to the current output terminal of the main switching element Q801.

In addition, the auxiliary winding $N_b$ is connected with the same polarity to the primary winding $N_p$, and is connected with different polarity to the secondary winding $N_s$. A starting resistor R801 is connected between the positive side of the input voltage $V_{in}$ and a control terminal of the main switching element Q801. In addition, a resistor R802 is connected between the control terminal of the main switching element Q801 and the negative side of the input voltage $V_{in}$, and divides the input voltage $V_{in}$ with the starting resistor R801 so as to generate a voltage sufficient to permit the main switching element Q801 to be conductive. A capacitor C801 and resistors R803 and R804 are connected between the control terminal of the main switching element Q801 and one end of the auxiliary winding $N_b$. A diode D801 is connected between the ends of the resistor R804 in the direction that a cathode thereof is on the auxiliary winding $N_b$ side, so as to adjust speed of turning on and off the main switching element Q801.

The switching element Q802 is disposed for controlling conductive and non-conductive states of the main switching element Q801. A current input terminal of the switching element Q802 is connected to the control terminal of the main switching element Q801, and a current output terminal thereof is connected to the negative side of the input voltage $V_{in}$. A capacitor C802 is connected between the control terminal and the current output terminal of the switching element Q802. A resistor R805 is connected between the one end of the auxiliary winding $N_b$ and the control terminal of the switching element Q802 so as to form a time constant circuit with the capacitor C802.

A resistor R806 is connected between a current input terminal on the primary side of a photocoupler IC801 and the control terminal of the main switching element Q801 so as to limit a current flowing through the photocoupler IC801. A current output terminal of the phototransistor of the photocoupler IC801 is connected to the control terminal of the switching element Q802. An anode of the rectifying diode D802 is connected to the secondary winding $N_s$ of the insulating transformer T801 on the side of different polarity to the primary winding. On the other hand, an electrolytic capacitor C803 is connected between a cathode of the diode D802 and the secondary winding $N_s$ on the side of the same polarity to the primary winding $N_p$ so as to smooth a ripple voltage rectified by the diode D802.

An output voltage $V_{out}$ is divided by resistors R807 and R808, and the divided voltage is supplied to a detection terminal (positive terminal) of an operational amplifier IC802. The operational amplifier IC802 compares a detection voltage applied to the detection terminal with a reference voltage applied to an inverting input terminal (negative terminal) of the operational amplifier IC802 so as to change the voltage at an output terminal thereof. Thus, a current flowing through the diode on the light emission side of the photocoupler IC801 is controlled via a resistor R809. A resistor R810 and a capacitor C804 are connected between a non-inverting input terminal (serving also as the detection terminal) and the output terminal of the operational amplifier IC802 for phase compensation so as to prevent oscillation during the control.

The main switching element Q801 becomes conductive when a voltage is applied to the control terminal via the starting resistor R801 and the resistor R802. When the main switching element Q801 becomes conductive, the input voltage $V_{in}$ is applied to the primary winding $N_p$, and the auxiliary winding $N_b$ induces a voltage having a positive polarity on the same polarity side as the primary winding. In this case, a voltage is induced also in the secondary winding $N_s$, but the induced voltage has a negative polarity at the anode of the rectifying diode D802. Therefore, the voltage is not transmitted to the secondary side.

In this case, an excitation current is proportional to time and becomes a current $I_{1p}$ given by the expression (1) after an on time period $t_{on}$:

$$I_{1p} = \frac{V_{in}}{L_p} t_{on} \qquad (1)$$

where $L_p$ represents primary inductance of the insulating transformer T801.

A current flowing through the primary winding $N_p$ only includes the excitation current of the insulating transformer T801, and energy proportional to square of the excitation current is accumulated in the insulating transformer T801. Energy $P_{in}$ accumulated in the insulating transformer T801 is given by the following expression (2):

$$P_{in} = \frac{1}{2} L_p I_{1p}^2 f = \frac{1}{2} L_p \left( \frac{V_{in}}{L_p} t_{on} \right)^2 f \qquad (2)$$

where f represents an oscillating frequency (Hz) of the RCC, and specifically is a switching operation frequency for turning on and off the main switching element Q801.

After that, the capacitor C802 of the time constant circuit including the resistor R805 and the capacitor C802 is charged from the auxiliary winding $N_b$. Further, when a voltage across the terminals of the capacitor C802 becomes higher than a threshold value that turns on the switching element Q802, the switching element Q802 becomes conductive. When the switching element Q802 becomes conductive, the voltage at the control terminal of the main switching element Q801 is decreased so that the main switching element Q801 becomes non-conductive.

In this case, a voltage having a polarity opposite to a starting polarity is generated in each winding of the insulating transformer T801. Because a voltage having a positive polarity at the anode of the rectifying diode D802 is generated in the secondary winding, energy accumulated in the insulating transformer T801 is rectified and smoothed so as to be transmitted to the secondary side. When the energy accumulated in the insulating transformer T801 given by the expression (2) is completely transmitted to the secondary side, the main switching element Q801 becomes conductive again. This is because when the energy is completely transmitted to the secondary side, a voltage is positively applied again to the control terminal of the main switching element Q801 from a C-coupling (capacitive coupling) capacitor C801 as back swing.

The current from the photocoupler IC801 increases when the output voltage $V_{out}$ is high. Therefore, when the output voltage $V_{out}$ is high, a large amount of current is supplied to the capacitor C802 so that charging time of the capacitor C802 is shortened. When the charging time of the capacitor C802 is shortened, non-conductive time of the switching element Q802 is shortened. In other words, conductive time of the main switching element Q801 is shortened. When the conductive time of the main switching element Q801 is shortened, the energy that is accumulated in the insulating transformer T801 is decreased so that the output voltage $V_{out}$ is dropped. On the other hand, when the output voltage $V_{out}$ is low, the opposite operation is performed. Through the operation described above, the RCC performs constant voltage operation so that the output voltage $V_{out}$ becomes a predetermined voltage. An off time period $t_{off}$ of the RCC is calculated by the following expression (3).

$$t_{off} = \frac{V_{in}}{V_{out}} \frac{N_s}{N_p} t_{on} \qquad (3)$$

On the other hand, the on time period $t_{on}$ is given by the expression (4) derived from the expression (2).

$$t_{on} = \sqrt{\frac{2 P_{in}}{L_p f}} \cdot \frac{L_p}{V_{in}} \qquad (4)$$

Here, because the oscillating frequency f (Hz) is given by $f=1/(t_{on}+t_{off})$, the oscillating frequency f is given by the following expression (5) derived from the expression (3) and the expression (4).

$$f = \frac{V_{in}^2}{2 L_p P_{in} \left( 1 + \frac{N_s}{N_p} \frac{V_{in}}{V_{out}} \right)^2} \qquad (5)$$

As understood from the expression (5), the oscillating frequency f becomes lower as the energy $P_{in}$ (hereinafter referred to also as an input power $P_{in}$) becomes larger. In addition, as understood from the expression (5), in contrast, as the input power $P_{in}$ becomes smaller (becomes light load), the oscillating frequency f becomes higher. In addition, as the input voltage $V_{in}$ becomes higher, the oscillating frequency f becomes higher. In addition, as understood from the expression (4), as the input voltage $V_{in}$ becomes higher, the on time period $t_{on}$ becomes shorter, and hence an on-duty ($t_{on}/T$) (here, an oscillation period $T=t_{on}+t_{off}$) becomes smaller. The RCC basically operates as described above.

<In Case where Input Power $P_{in}$ is Large>

FIG. 2A illustrates waveforms of individual portions of the RCC illustrated in FIG. 1A in a case where the input power $P_{in}$ is large. Waveform (a) of FIG. 2A is a waveform of a voltage (drain-source voltage) Vds between the current input terminal and the current output terminal of the main switching element Q801, and waveform (b) of FIG. 2A is a waveform of a current I1 flowing through the main switching element Q801. Further, waveform (c) of FIG. 2A is a waveform of a current Is flowing through the rectifying diode D802. In addition, a maximum value (Vds(max)) (broken line) of the drain-source voltage Vds, the off time period $t_{off}$, the on time period $t_{on}$, and the oscillation period T (=1/f) are also illustrated in the waveform (a) of FIG. 2A. In addition, a peak current $I_{1p}$ (broken line) of the current I1 is also illustrated in the waveform (b) of FIG. 2A.

On the other hand, FIG. 2B illustrates waveforms similar to those of FIG. 2A in a case where the input power $P_{in}$ is small (light load) in contrast to the case of FIG. 2A. As described above, when the input power $P_{in}$ is small, the oscillation period $T=1/f=t_{on}+t_{off}$ becomes smaller (shorter), and the oscillating frequency f becomes higher, compared with the case where the input power $P_{in}$ is large.

(Basic Operation of Synchronous Rectification)

In the rectification method using the rectifying diode D802 described above with reference to FIG. 1A, namely the diode rectification, power loss is caused by the forward voltage drop of the rectifying diode D802. As a technology of reducing the power loss caused by the forward voltage drop of the rectifying diode D802, there is a circuit form using synchronous rectification. In the following, a circuit operation using the synchronous rectification is described. The portion having the same function as that in the diode rectification illustrated in FIG. 1A is denoted by the same symbol, and description thereof is omitted.

(Synchronous Rectification Ringing Choke Converter)

Figure 1B:
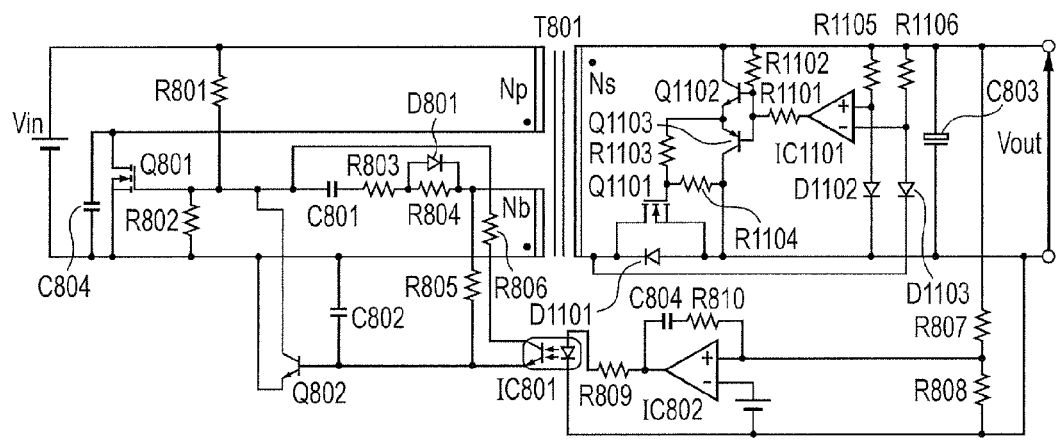

FIG. 1B is a diagram illustrating a circuit structure of the synchronous rectification RCC. A current output terminal of the switching element Q1101 such as a MOSFET that performs the synchronous rectification operation as a second switching element is connected to one end of the insulating transformer T801, and a current input terminal thereof is connected to a low potential side of the output voltage $V_{out}$. In addition, a parasitic diode D1101 is connected between the current input terminal and the current output terminal of the switching element Q1101. A comparator IC1101 is connected to control terminals of emitter follower switching elements Q1102 and Q1103 via a resistor R1101. A current input terminal of the switching element Q1102 is connected to a high potential side of the output voltage $V_{out}$, and the control terminal of the switching element Q1102 is connected to the high potential side of the output voltage $V_{out}$ via a resistor R1102. A current output terminal of the switching element Q1102 and a current input terminal of the switching element Q1103 are connected to each other, and the node thereof is connected to a control terminal of the switching element Q1101 via a resistor R1103. A current output terminal of the switching element Q1103 is connected to the low potential side of the output voltage $V_{out}$, and the control terminal of the switching element Q1101 is connected to the low potential side of the output voltage $V_{out}$ via a resistor R1104. An anode terminal of a diode D1102 is connected to a non-inverting input terminal of the comparator IC1101 from the high potential side of the output voltage $V_{out}$ via a resistor R1105, and a cathode terminal of the diode D1102 is connected to the low potential side of the output voltage $V_{out}$. An anode terminal of a diode D1103 is connected to an inverting input terminal of the comparator IC1101 from the high potential side of the output voltage $V_{out}$ via a resistor R1106. Further, a cathode terminal of the diode D1103 is connected to the current output terminal of the switching element Q1101 (one end of the insulating transformer T801).

When power accumulation in the insulating transformer T801 on the primary side is finished and power transmission to the secondary side is started, a potential at the cathode of the diode D1103 drops so that a potential at the inverting input terminal of the comparator IC1101 drops. Further, a potential at the inverting input terminal of the comparator IC1101 becomes relatively low compared with a potential at the non-inverting input terminal, and hence an output terminal of the comparator IC1101 becomes high impedance. When the output terminal of the comparator IC1101 becomes high impedance, a base current is supplied to the control terminal of the switching element Q1102 via the resistor R1102 so that the switching element Q1102 becomes conductive. When the switching element Q1102 becomes conductive, a drive voltage is supplied to the control terminal of the switching element Q1101 for synchronous rectification so that the switching element Q1101 becomes conductive. When the switching element Q1101 for synchronous rectification becomes conductive, energy is accumulated in the electrolytic capacitor C803, and is output as the DC output voltage $V_{out}$. After energy discharge from the insulating transformer T801 to the electrolytic capacitor C803 is completed, a potential at the inverting input terminal of the comparator IC1101 becomes equal to a potential of the high potential side of the output voltage $V_{out}$. On the other hand, a potential at the non-inverting input terminal of the comparator IC1101 is higher than a potential of the low potential side of the output voltage $V_{out}$ by a forward voltage of the diode D1102. Therefore, a potential at the output terminal of the comparator IC1101 is the same as the potential of the low potential side of the output voltage $V_{out}$. When the potential of the output terminal of the comparator IC1101 drops, the switching element Q1103 becomes conductive so that a voltage at the control terminal of the switching element Q1101 is dropped. Therefore, the switching element Q1101 becomes non-conductive.

Figure 3:
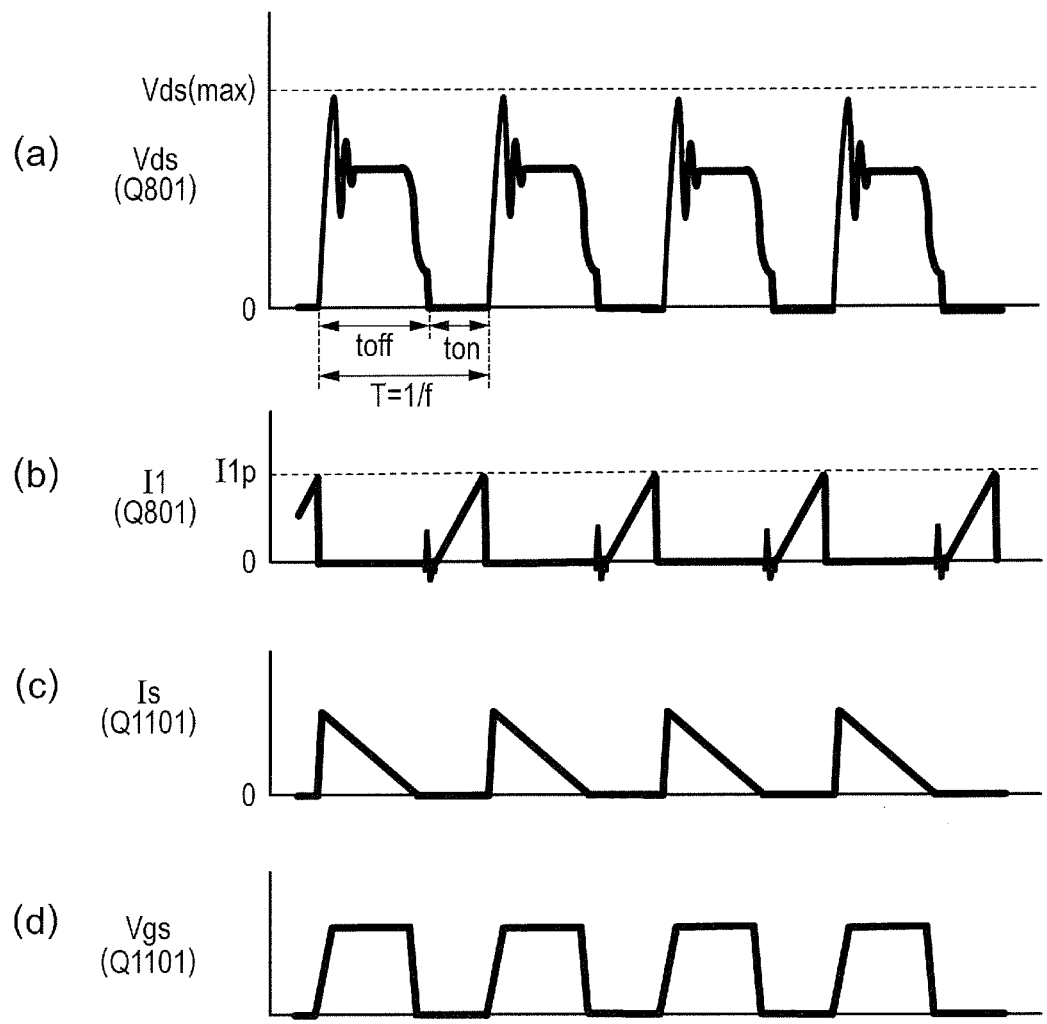
FIG. 3 is a diagram illustrating operational waveforms of individual portions of the related-art switching power supply for comparing with the embodiments.

FIG. 3 illustrates waveforms of individual portions of the synchronous rectification RCC illustrated in FIG. 1B when the input power $P_{in}$ is small (light load). Waveform (a) of FIG. 3 and waveform (b) of FIG. 3 are respectively the same as waveform (a) of FIG. 2B and waveform (b) of FIG. 2B, and hence description thereof is omitted. Waveform (c) of FIG. 3 is a waveform of the current Is flowing through the switching element Q1101 for synchronous rectification. In addition, waveform (d) of FIG. 3 indicates a gate voltage Vgs of the switching element Q1101. As described above, when the potential of the output terminal of the comparator IC1101 changes in accordance with accumulation and discharge of energy of the insulating transformer T801, the potential of the control terminal of the switching element Q1101 can be changed so that the same operation as the diode rectification can be performed. Further, by reducing the ON-resistance of the switching element Q1101 in the conductive state, power loss in the conductive state, which is determined by (current)$^2 \times$ON-resistance, can be reduced to be smaller than power loss due to the forward voltage drop of the diode D802 in the diode rectification. Thus, in the synchronous rectification, it is possible to improve power conversion efficiency of the switching power supply.

However, as described above, similarly to the diode rectification RCC, the synchronous rectification RCC also has a problem in that the oscillating frequency f is increased in a light load state (with a small input voltage $P_{in}$). In addition, compared with a case where the diode rectification is used, because power conversion efficiency is improved, there is a problem in that the oscillating frequency f is increased when supplying energy to the same load. In the following, embodiments of the present invention for solving the problems are described in detail.

A first embodiment of the present invention is described.

Structure of Power Supply

Figure 4:
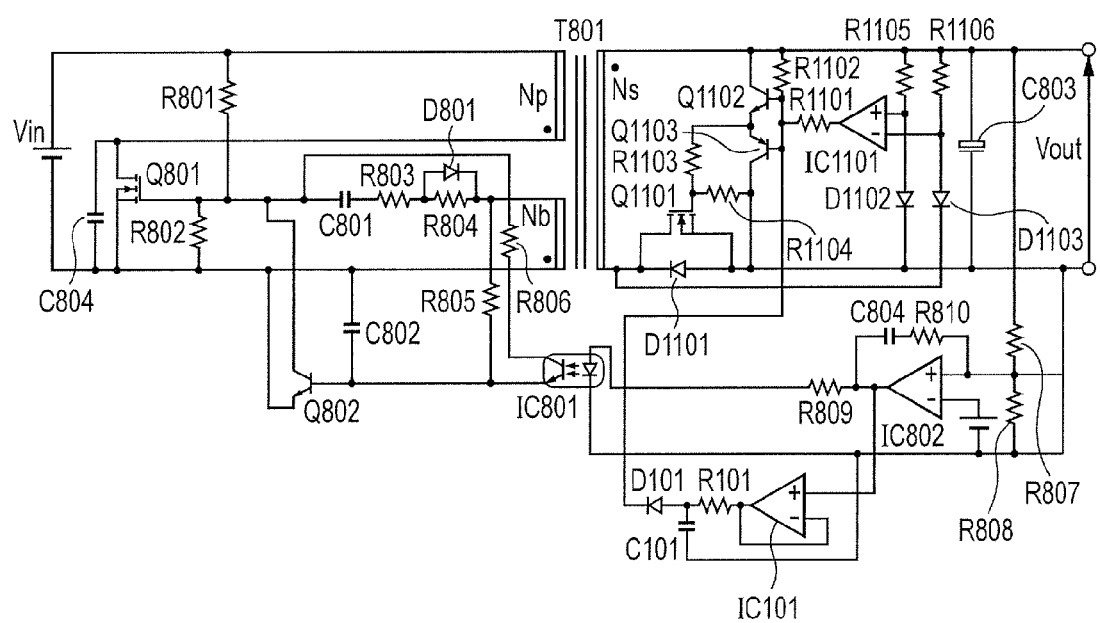
FIG. 4 is a circuit diagram illustrating a structure of a switching power supply according to a first embodiment of the present invention.

FIG. 4 is a circuit diagram illustrating a structure of a switching power supply of the first embodiment. A portion having the same function as in the circuit described above with reference to FIG. 1B is denoted by the same symbol, and description thereof is omitted. The switching power supply of this embodiment is different from the circuit illustrated in FIG. 1B in that a delay circuit as a delay device is added, which includes an operational amplifier IC101, a resistor R101, a capacitor C101, and a diode D101. In the following, an operation of the delay circuit is described.

An inverting input terminal (negative terminal) of the operational amplifier IC101 is directly connected to an output terminal of the operational amplifier IC101 so as to form a voltage follower circuit. An output terminal of the operational amplifier IC802 as a control device for controlling the output voltage $V_{out}$ is connected to a non-inverting input terminal (positive terminal) of the operational amplifier IC101. One terminal of the capacitor C101 is connected to the output terminal of the operational amplifier IC101 via the resistor R101, and the other terminal of the capacitor C101 is connected to the low potential side of the output voltage $V_{out}$. The one terminal of the capacitor C101 is connected to an anode of the diode D101, and a cathode of the diode D101 is connected to control terminals of the switching elements Q1102 and Q1103. In other words, the one terminal of the capacitor C101 is connected via the diode D101 to the control terminals of the switching elements Q1102 and Q1103 for driving the switching element Q1101 for synchronous rectification.

Here, a voltage at the output terminal of the operational amplifier IC802 for controlling the output voltage $V_{out}$ is dropped when a load current of the switching power supply increases so that the input power $P_{in}$ is increased. In contrast, the output terminal voltage of the operational amplifier IC802 rises when the load current of the switching power supply decreases so that the input power $P_{in}$ is decreased. On the other hand, as understood from the expression (5), when the input power $P_{in}$ is increased, the oscillating frequency f drops. When the input voltage $P_{in}$ is decreased, the oscillating frequency f rises. In this way, the output terminal voltage of the operational amplifier IC802 increases or decreases in accordance with an increase or decrease of the load of the switching power supply, that is, in accordance with the oscillating frequency f of the switching power supply. Specifically, when the oscillating frequency f of the switching power supply is high, the output terminal voltage of the operational amplifier IC802 rises. When the oscillating frequency f is low, the output terminal voltage of the operational amplifier IC802 drops. The delay circuit including the operational amplifier IC101, the resistor R101, the capacitor C101, and the diode D101 is supplied with the output terminal voltage of the operational amplifier IC802 as an input signal. Further, the voltage follower circuit including the operational amplifier IC101 charges the capacitor C101 that is connected to the output terminal of the operational amplifier IC101 via the resistor R101 so that the capacitor C101 has a voltage value equal to the output terminal voltage of the operational amplifier IC802. The diode D101 is connected so as to prevent the capacitor C101 from being charged from the control terminals of the switching elements Q1102 and Q1103.

With this circuit structure, when the oscillating frequency f of the switching power supply is high, the capacitor C101 is charged to a higher potential. In other words, a charge voltage of the capacitor C101 is set to a high value. On the other hand, when the oscillating frequency f of the switching power supply is low, the capacitor C101 is charged to a lower potential. In other words, the charge voltage of the capacitor C101 is set to a low value. When the power transmission to the secondary side of the insulating transformer T801 is finished, the potential of the output terminal of the comparator IC1101 changes to the low potential side so that the switching element Q1101 for synchronous rectification becomes non-conductive. However, in this embodiment, the capacitor C101 constituting the delay circuit is charged, and the capacitor C101 has a charge. Therefore, even when the potential of the output terminal of the comparator IC1101 changes to the low potential side, the switching element Q1101 does not promptly change to the non-conductive state. This is because the control terminal voltage of the switching element Q1101 does not promptly drop to a threshold voltage Vth (see the waveform (d) of FIG. 5 described later) or lower that determines the conductive or non-conductive state of the switching element Q1101, because of the charge in the capacitor C101.

Figure 5:
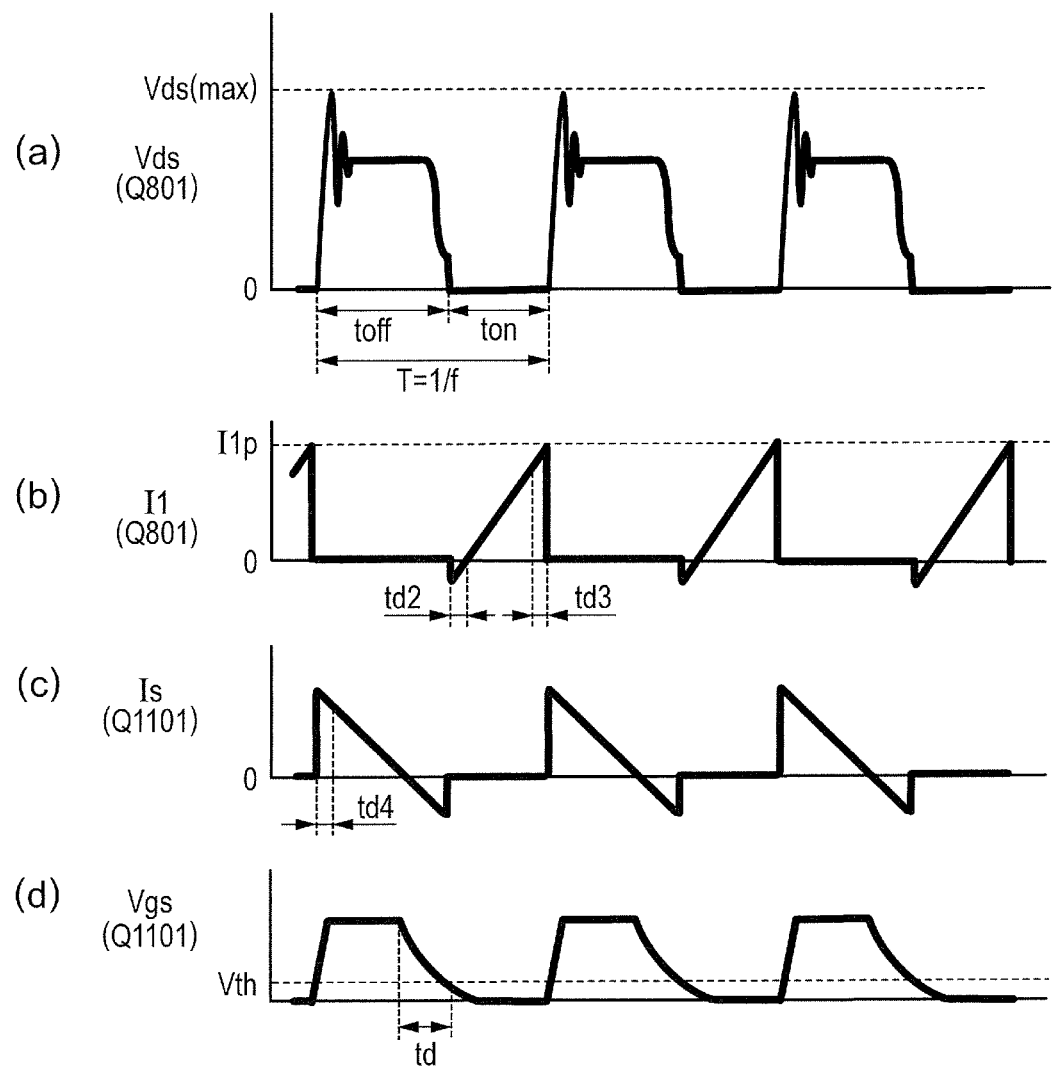
FIG. 5 is a diagram illustrating operational waveforms of individual portions of the switching power supply of the first embodiment.

This embodiment has a feature in that a delay time period td (see the waveform (d) of FIG. 5) is changed in accordance with the oscillating frequency f of the switching power supply. Here, the delay time period td means a time period from a time point at which the potential of the output terminal of the comparator IC1101 changes to the low potential side to a time point at which the control terminal voltage of the switching element Q1101 drops to be the threshold voltage Vth or lower.

In addition, this embodiment has a feature in that the delay time period td is increased when the oscillating frequency f is high, while the delay time period td is shortened when the oscillating frequency f is low. In this way, in this embodiment, as the oscillating frequency f is higher, the timing for changing the switching element Q1101 from the conductive state to the non-conductive state is delayed more. In other words, a period of the conductive state of the switching element Q1101 when the oscillating frequency f is high is longer than a period of the conductive state of the switching element Q1101 when the oscillating frequency f is low. This means that the delay circuit in this embodiment described above has a function of adjusting the conductive state period of the switching element Q1101 in accordance with the oscillating frequency.

In this way, in this embodiment, when the oscillating frequency f of the switching power supply is high, the output terminal voltage of the operational amplifier IC802 is high, and the output terminal voltage of the operational amplifier IC101 is also high so that the capacitor C101 is charged to a higher potential. Therefore, when the oscillating frequency f of the switching power supply is high, the charging time of the capacitor C101 is increased so that the delay time period td of the delay circuit is elongated. On the other hand, when the oscillating frequency f of the switching power supply is low, the output terminal voltage of the operational amplifier IC802 is low, and the output terminal voltage of the operational amplifier IC101 is also low so that the capacitor C101 is charged to a low potential. Therefore, when the oscillating frequency f of the switching power supply is low, the charging time of the capacitor C101 is shortened so that the delay time period td of the delay circuit is shortened. From the above discussion, it can be said that the delay time period td of the delay circuit, namely the timing at which the switching element Q1101 changes from the conductive state to the non-conductive state is determined in accordance with the output voltage of the operational amplifier IC101.

Operation Waveform of Power Supply

FIG. 5 illustrates operational waveforms of individual portions of the power supply of this embodiment. FIG. 5 illustrates operational waveforms when the input power $P_{in}$ is small, namely in a light load state. Further, FIG. 5 illustrates four waveforms similarly to FIG. 3 described above, and description of the waveform is omitted. Here, the waveform (d) of FIG. 5 representing the gate voltage Vgs of the switching element Q1101, the threshold voltage Vth (broken line) that determines the conductive and non-conductive states of the switching element Q1101 is indicated.

In this embodiment, as illustrated in the waveform (d) of FIG. 5, the time period until the voltage Vgs becomes the threshold voltage Vth or lower is longer than the time period until the voltage Vgs becomes the threshold voltage Vth or lower illustrated in the waveform (d) of FIG. 3, by the delay time period td. Further, the conductive state of the switching element Q1101 becomes longer and the off time period $t_{off}$ of the main switching power supply becomes longer, by the delay time period td. In other words, in this embodiment, by providing the delay time period td, the oscillation period T of the main switching element Q801 is increased, and hence the oscillating frequency f is lowered.

The current I1 flowing through the main switching element Q801 illustrated in the waveform (b) of FIG. 3 only includes the current flowing from the current input terminal to the current output terminal having a positive current value. However, in this embodiment, as illustrated in the waveform (b) of FIG. 5, there is a time period in which the current value becomes negative (in a part of a time period td2), and the current I1 also flows from the current output terminal to the current input terminal. This is because the switching element Q1101 for synchronous rectification maintains the conductive state even after the power transmission to the secondary side of the insulating transformer T801 is finished, and hence the insulating transformer T801 is reversely excited. The oscillation period ($T=1/f=t_{on}+t_{off}$) includes the time period td2, a time period td3, and a time period td4 in accordance with the delay time period td. Here, the time period td2 is a time period in which the insulating transformer T801 is reversely excited by the delay time period td of the delay circuit so that a current flows through the switching element Q801 from the current output terminal to the current input terminal. In addition, the time period td3 is a time period in which a current flows through the switching element Q801 to compensate for the decrease of transformer excitation due to the reverse excitation, and can be said to be a time period for offsetting the time period td2. Further, the time period td4 is a time period in which the current generated due to the time period td3 flows through the switching element Q1101. In other words, when the delay time period td is long, each of the time periods td2 to td4 is increased. When the delay time period td is short, each of the time periods td2 to td4 is shortened. In this way, in this embodiment, the off time period $t_{off}$ and the on time period $t_{on}$ of the switching element Q801 are increased due to the delay time period td of the delay circuit, and hence the oscillation period T is increased so that the oscillating frequency f can be lowered.

Relationship Between Load Current and Oscillating Frequency

Figure 6:
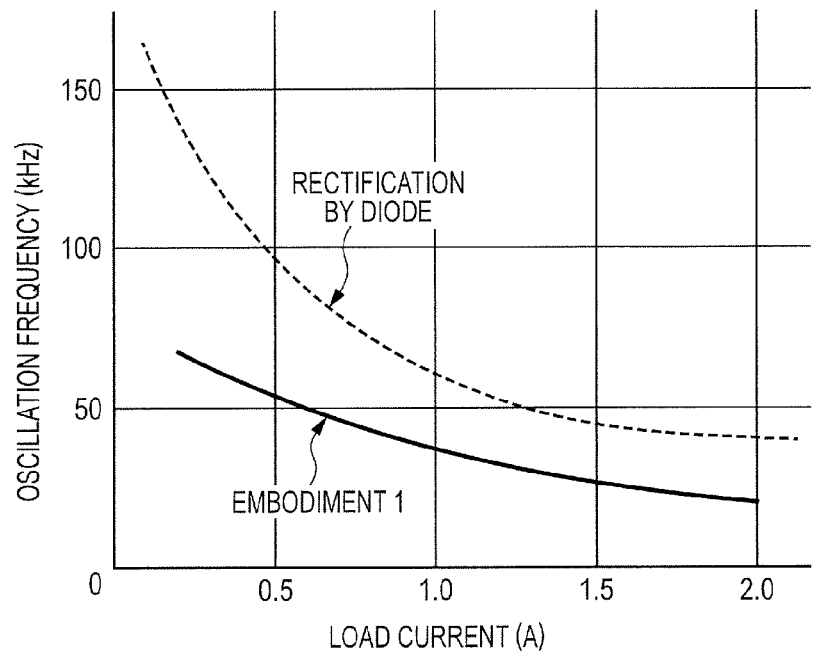
FIG. 6 is a graph showing oscillating frequency to load current characteristics of the switching power supply of the first embodiment.

FIG. 6 shows an example of a relationship between the load current (ampere (A)) and the oscillating frequency f (kilohertz (kHz)) of the switching power supply. In FIG. 6, a broken line indicates a transition state of the oscillating frequency f in the related-art diode rectification (or the synchronous rectification without the delay circuit), and a solid line indicates a transition of the oscillating frequency f in this embodiment. In the circuit of the related-art diode rectification (or the synchronous rectification without the delay circuit), the oscillating frequency f is rapidly raised in a light load state (of 0.5 A or smaller, in particular) and may reach to 150 kHz or higher. In contrast, in this embodiment, it is possible to lower the oscillating frequency f evenly compared with the diode rectification. In particular, it is possible to suppress an increase of the oscillating frequency f in a light load state.

Note that, in this embodiment, there has been described the circuit form using the comparator for the synchronous rectification circuit structure. However, there are various other circuit forms such as one using a dedicated IC, and this embodiment can be applied to each of the circuit forms.

As described above, according to this embodiment, it is possible to reduce the oscillating frequency in a light load state and to reduce noise. In this embodiment, it is possible to set the oscillating frequency f to be outside a band of 150 kHz to 30 MHz restricted by the noise terminal voltage (see FIG. 6). Therefore, it is possible to reduce a space occupied by the filter circuit for suppressing noise so that the apparatus can be downsized.

Next, a second embodiment of the present invention is described.

Structure of Power Supply Circuit

Figure 7:
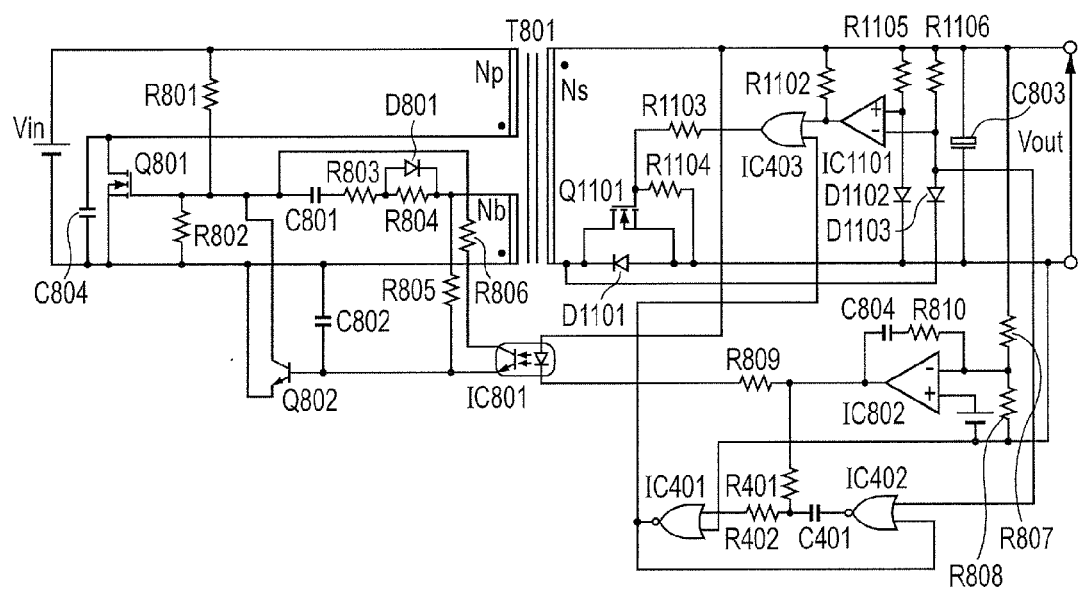
FIG. 7 is a circuit diagram illustrating a structure of a switching power supply according to a second embodiment of the present invention.

FIG. 7 is a circuit diagram illustrating a structure of a switching power supply of the second embodiment. A portion having the same function as in the circuit described above with reference to FIG. 1B is denoted by the same symbol, and description thereof is omitted. The power supply of the first embodiment described above includes the delay circuit including the operational amplifier IC101, the resistor R101, the capacitor C101, and the diode D101. This embodiment has a feature in that a delay circuit including logic gates IC401, IC402, and IC403, resistors R401 and R402, and a capacitor C401 is used instead of the delay circuit in the first embodiment. In this embodiment, because the logic gate IC403 is added, the switching elements Q1102 and Q1103 are not necessary. In addition, in this embodiment, the output terminal of the operational amplifier IC802 for controlling the output voltage $V_{out}$ is connected to the cathode terminal of the photocoupler IC801, and the anode terminal of the photocoupler IC801 is connected to the high potential side of the output voltage $V_{out}$. Further, this embodiment is different in that the non-inverting input terminal and the inverting input terminal of the operational amplifier IC802 are exchanged from the case of the operational amplifier IC802 in the first embodiment. In other words, in contrast to the structure of the first embodiment, the output terminal voltage of the operational amplifier IC802 rises when the input power $P_{in}$ is large (the oscillating frequency f is low), and the output terminal voltage of the operational amplifier IC802 drops when the input power $P_{in}$ is small (the oscillating frequency f is high). Note that, the logic gates IC401 and IC402 are NOR gates, and are referred to also as NOR gates IC401 and IC402 in the following description. In addition, the logic gate IC403 is an OR gate, and is referred to also as an OR gate IC403 in the following description.

The NOR gates IC401 and IC402, the resistors R401 and R402, and the capacitor C401 constitute a one-shot multivibrator circuit. One of input terminals of the NOR gate IC402 is connected to the anode terminal of the diode D1103, and one end of the resistor R401 is connected to the output terminal of the operational amplifier IC802. An output terminal of the NOR gate IC402 is connected to one of input terminals of the NOR gate IC401 via the capacitor C401 and the resistor R402. The other input terminal of the NOR gate IC401 is connected to the low potential side of the output voltage $V_{out}$. An output terminal of the NOR gate IC401 is directly connected to the other input terminal of the NOR gate IC402 and is connected to one of input terminals of the OR gate IC403. The other input terminal of the OR gate IC403 is connected to the output terminal of the comparator IC1101, and an output terminal of the OR gate IC403 is connected to the control terminal of the switching element Q1101 via the resistor R1103.

When a potential of the input terminal of the NOR gate IC402 changes from a low level to a high level, the one-shot multivibrator circuit outputs a high level signal for a period defined by the time constant circuit of R401 and C401. In other words, the high level signal is supplied to the input terminal of the OR gate IC403 from the one-shot multivibrator circuit. Therefore, the OR gate IC403 outputs the high level signal to the control terminal of the switching element Q1101 for the period defined by the time constant circuit of R401 and C401, and hence the switching element Q1101 continues to be conductive. The time constant circuit including the resistor R401 and the capacitor C401 is connected to the output terminal of the operational amplifier IC802 via the resistor R401. When the input power $P_{in}$ is large so that the oscillating frequency f is low, the output terminal of the operational amplifier IC802 has a high potential. When the input power $P_{in}$ is small so that the oscillating frequency f is high, the output terminal of the operational amplifier IC802 has a low potential. Therefore, the period defined by the time constant circuit of R401 and C401 is long when the oscillating frequency f is high, and is short when the oscillating frequency f is low. Therefore, the structure of this embodiment can also elongate the delay time period td when the oscillating frequency f is high, and shorten the delay time period td when the oscillating frequency f is low by the time constant circuit of R401 and C401.

By the operation described above, it is possible to constitute the delay circuit even when using the one-shot multivibrator circuit, and hence the same effect as described above in the first embodiment can be obtained. Further, because the logic gate can be used to constitute the delay circuit in this embodiment, the circuit structure can be more suitable for realizing the integrated circuit.

As described above, according to this embodiment, it is possible to reduce the oscillating frequency in a light load state and to reduce noise.

Next, a third embodiment of the present invention is described.

Structure of Power Supply

Figure 8A:
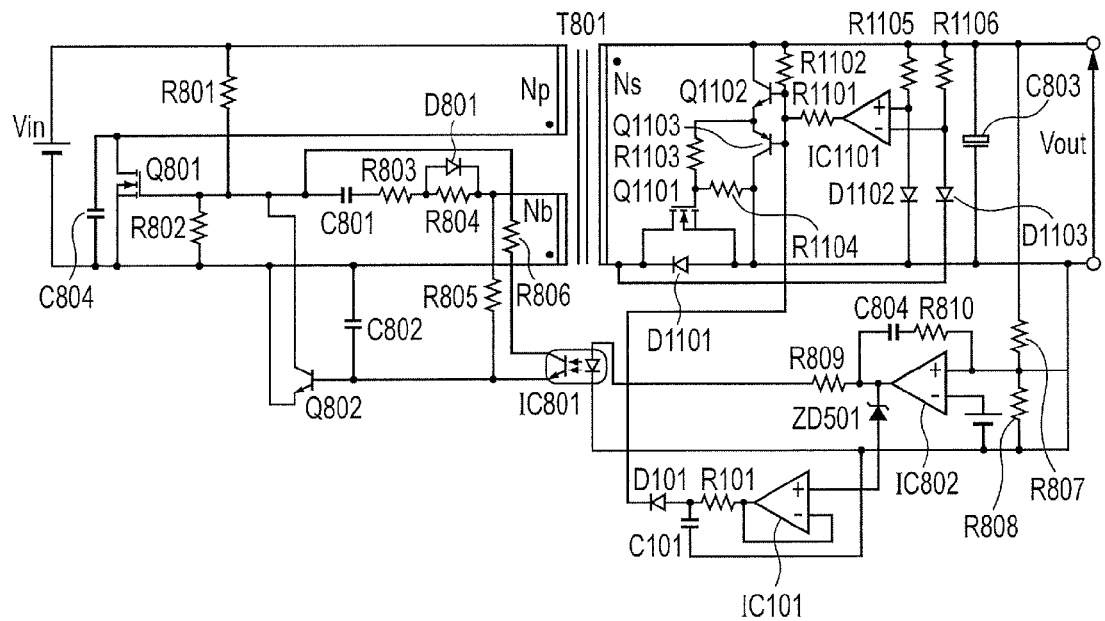
FIG. 8A is a circuit diagram illustrating a structure of a switching power supply according to a third embodiment of the present invention.

FIG. 8A is a circuit diagram illustrating a structure of a switching power supply of the third embodiment. A portion having the same function as in the circuits described above with reference to FIG. 1B and FIG. 4 is denoted by the same symbol, and description thereof is omitted. This embodiment is different from the first embodiment and has a feature in that a zener diode ZD501 is added to a portion between the output terminal of the operational amplifier IC802 and the non-inverting input terminal of the operational amplifier IC101 constituting the delay circuit. In this embodiment, the zener diode ZD501 is added in such a manner that the non-inverting input terminal of the operational amplifier IC101 constituting the delay circuit is on the anode side while the output terminal of the operational amplifier IC802 is on the cathode side. Thus, in this embodiment, the capacitor C101 constituting the delay circuit is charged when the output terminal voltage of the operational amplifier IC802 becomes equal to or higher than a zener voltage Vz of the zener diode ZD501. In other words, when the oscillating frequency f rises so that the output terminal voltage of the operational amplifier IC802 rises, the capacitor C101 constituting the delay circuit is charged via the zener diode ZD501. In contrast, when the oscillating frequency f is low so that the output terminal voltage of the operational amplifier IC802 is lower than the zener voltage Vz of the zener diode ZD501, the capacitor C101 constituting the delay circuit is not charged, and hence the delay time period td is zero.

Relationship Between Load Current and Oscillating Frequency

Figure 8B:
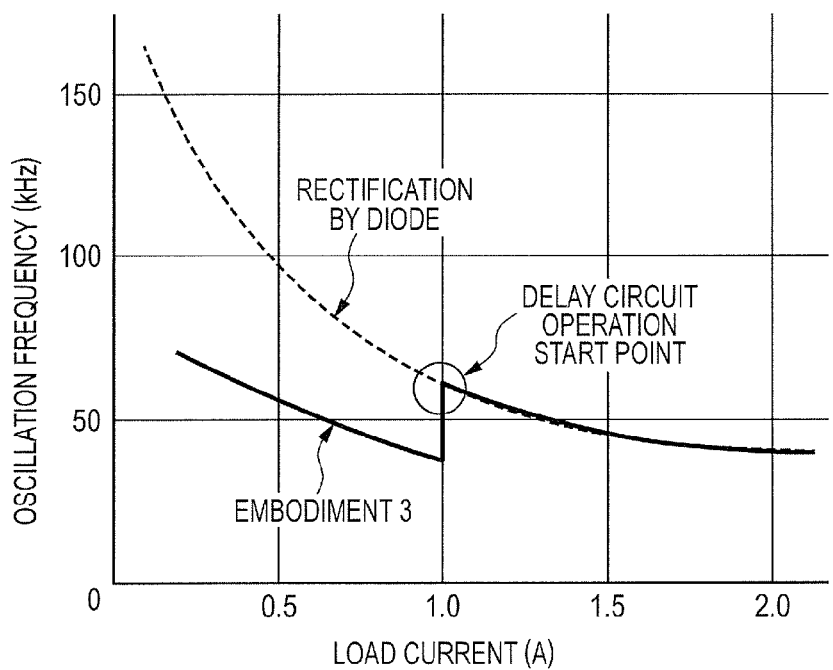
FIG. 8B is a graph showing oscillating frequency to load current characteristics of the switching power supply of the third embodiment.

FIG. 8B shows an example of a relationship between the load current (ampere) and the oscillating frequency (kHz) of the switching power supply of this embodiment. A broken line indicates a transition state of the oscillating frequency of the diode rectification (or the synchronous rectification without the delay circuit), and a solid line indicates a transition of the oscillating frequency of this embodiment. In the first embodiment, as described above with reference to FIG. 6, regardless of the value of the oscillating frequency f with which the switching power supply operates, the delay time period td is generated by the delay circuit in accordance with the output terminal voltage of the operational amplifier IC802 so that the oscillating frequency f of the switching power supply is lowered. On the other hand, in this embodiment, when the load current becomes equal to or lower than a value corresponding to a delay circuit operation start point enclosed by a circle in FIG. 8B, the delay circuit starts the operation so as to generate the delay time period td. For instance, in FIG. 8B, the delay circuit operation start point is the timing when the load current becomes 1.0 A. In this way, the zener diode ZD501 can be said to be an operation start device that activates the delay circuit to operate when the output voltage of the operational amplifier IC802 becomes equal to or higher than a predetermined value.

In this way, this embodiment has a structure in which an offset is given to the load current so that the delay circuit does not operate when a large amount of load current flows (namely, in a heavy load state or with a large input power $P_{in}$) and the oscillating frequency f is low. This is to prevent further decrease of the oscillating frequency f by operation of the delay circuit when a large amount of load current flows and the oscillating frequency f is low. This operation enables avoiding oscillation of the switching power supply in an audible range for human ears (20 kHz or lower) in a case of a large load current which causes the oscillating frequency f of the switching power supply to become too low. In addition, this embodiment enables simultaneously avoiding the problem in that it becomes difficult to use elements constituting the switching power supply within an appropriate derating when the oscillating frequency f becomes too low.

In this embodiment, as a device for giving an offset to the operation of the delay circuit, the zener diode ZD501 is disposed in the input unit of the delay circuit. However, as a voltage monitoring device serving as the device for giving the offset (offset device) to the operation of the delay circuit, various devices may be used instead of the zener diode so as to obtain the same effect as this embodiment. Note that, it is possible to add an offset device to the structure of the second embodiment. In this case, for example, the voltage monitoring device such as a zener diode may be connected in series between the output terminal of the operational amplifier IC802 and the resistor R401 of FIG. 7.

As described above, according to this embodiment, it is possible to reduce the oscillating frequency in a light load state so as to reduce noise. Further, an increase of the oscillating frequency of the switching power supply can be suppressed only in a light load state of the equipment, and hence it is possible to prevent the oscillating frequency from being too low in a heavy load state so as to be within an audible range for human ears.

Next, a fourth embodiment of the present invention is described.

Structure of Power Supply

Figure 9:
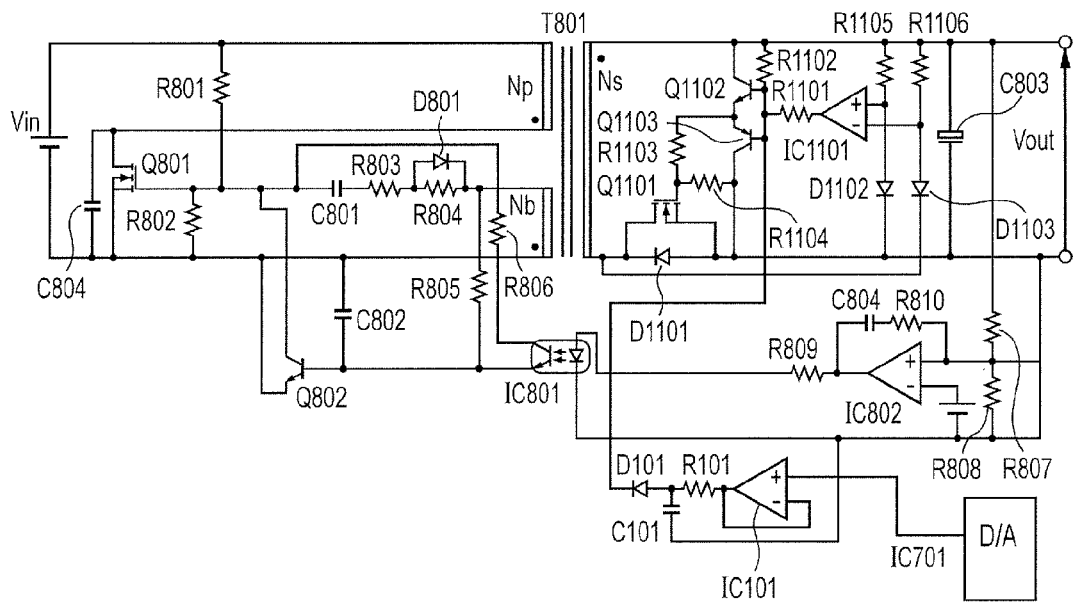
FIG. 9 is a circuit diagram illustrating a structure of a switching power supply according to a fourth embodiment of the present invention.

FIG. 9 is a circuit diagram illustrating a structure of a switching power supply of the fourth embodiment. A portion having the same function as in the circuits described above with reference to FIG. 1B and FIG. 4 is denoted by the same symbol, and description thereof is omitted. This embodiment is different from the first embodiment and has a feature in that a control circuit IC701 is connected to the delay circuit including the operational amplifier IC101, the resistor R101, the capacitor C101, and the diode D101. The control circuit IC701 as the control device controls the operation of the equipment that operates with power from the switching power supply.

In this embodiment, as the input signal to the delay circuit, for example, an output signal of a D/A converter for converting a digital signal to an analog signal, which is included in the control circuit IC701, is used. Further, this embodiment has an advantage in that a multivalue signal is output from the control circuit IC701 to the delay circuit at an arbitrary timing. In this way, in this embodiment, the oscillating frequency f can be arbitrarily selected based on information from the control circuit IC701. In other words, the control circuit IC701 can also be said to be an output device for outputting to the delay circuit a signal for determining timing at which the switching element Q1101 changes from the conductive state to the non-conductive state. With this structure, for example, in an image forming apparatus as an apparatus in which the power supply of this embodiment is mounted, the following effect can be obtained. Specifically, there is an advantage in that in a case where the oscillating frequency f of the switching power supply determined by the load current interferes with a drive frequency used for forming a latent image in the image forming apparatus, the oscillating frequency having a large influence of the interference can be intentionally avoided.

In this way, the oscillating frequency f of the switching power supply can be arbitrarily changed by the control circuit IC701 of this embodiment, and hence it is possible to provide the switching power supply having a wider application range. Note that, it is also possible to add the control circuit IC701 of this embodiment to the structure of the second embodiment, so as to set an arbitrary value of the oscillating frequency f. In this case, for example, the connection may be made so that the output signal of the control circuit IC701 may be supplied to the one-shot multivibrator circuit of the second embodiment illustrated in FIG. 7 via the resistor R401.

As described above, according to this embodiment, it is possible to reduce the oscillating frequency in a light load state and to reduce noise. In addition, according to this embodiment, it is possible to arbitrarily control the oscillating frequency f in accordance with a load state of the apparatus.

Next, a fifth embodiment of the present invention is described.

The power supply described in the first to fourth embodiments is applicable as, for example, a low voltage power supply of an image forming apparatus, that is, a power supply for supplying power to a controller (control unit) or a driving unit such as a motor. A description is now given of a structure of the image forming apparatus to which the power supply according to the first to fourth embodiments is applied.

Structure of Image Forming Apparatus

Figure 10:
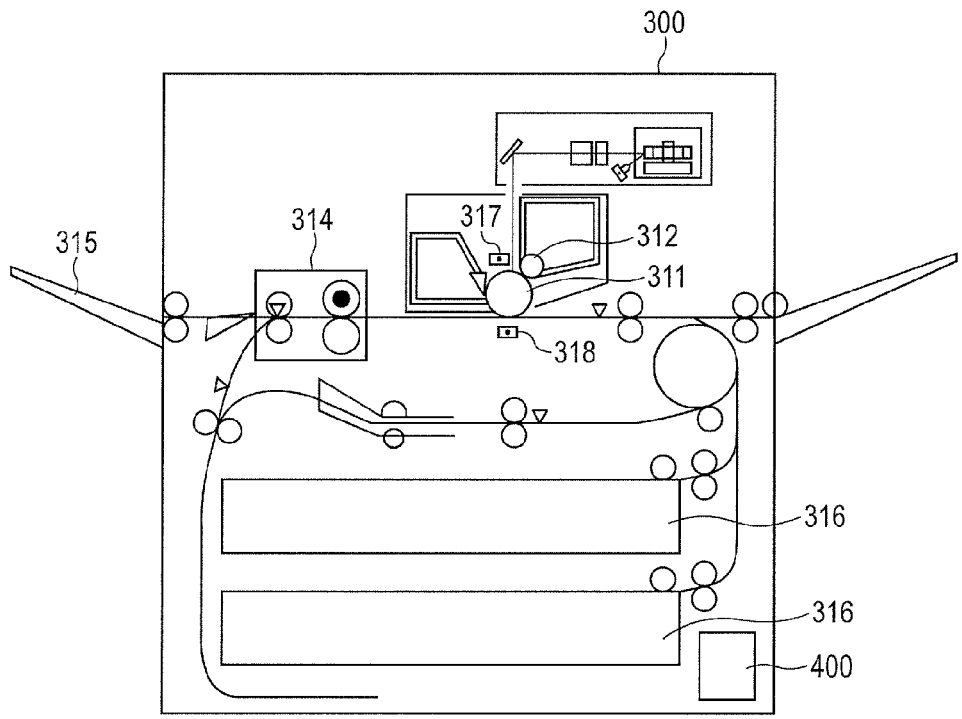
FIG. 10 is a diagram illustrating a structure of an image forming apparatus according to a fifth embodiment of the present invention.

A laser beam printer is described as an example of the image forming apparatus. FIG. 10 illustrates a schematic structure of the laser beam printer as an example of an electrophotographic printer. A laser beam printer 300 includes a photosensitive drum 311 as an image bearing member on which an electrostatic latent image is to be formed, a charging unit 317 (charging device) for uniformly charging the photosensitive drum 311, and a developing unit 312 (developing device) for developing the electrostatic latent image formed on the photosensitive drum 311 with toner. A toner image developed on the photosensitive drum 311 is transferred by a transfer unit 318 (transfer device) onto a sheet (not shown) as a recording material supplied from a cassette 316. The toner image transferred onto the sheet is fixed by a fixing unit 314 and is discharged to a tray 315. The photosensitive drum 311, the charging unit 317, the developing unit 312, and the transfer unit 318 correspond to an image forming unit. The laser beam printer 300 further includes a power supply 400 described in the first to fourth embodiments. Note that, the image forming apparatus to which the power supply 400 according to the first to fourth embodiments is applicable is not limited to the one exemplified in FIG. 10. For example, the image forming apparatus may include multiple image forming units. Further, the image forming apparatus may include a primary transfer unit for transferring the toner image formed on the photosensitive drum 311 onto an intermediate transfer belt, and a secondary transfer unit for transferring the toner image formed on the intermediate transfer belt onto a sheet.

The laser beam printer 300 includes a controller (not shown) for controlling an image forming operation of the image forming unit and a sheet conveyance operation. The power supply 400 according to the first to fourth embodiments supplies power to, for example, the controller. Further, the power supply 400 according to the first to fourth embodiments supplies power also to a driving unit such as a motor for rotating the photosensitive drum 311 or driving various kinds of rollers for conveying a sheet. In other words, the load current of the first to fourth embodiments flows through the controller and the driving unit. The image forming apparatus of this embodiment can reduce the load and power consumption by supplying power only to the controller, for example, in a standby state (for example, a power saving mode or a standby mode) for realizing power saving. In other words, in the image forming apparatus of this embodiment, in the power saving mode, the power supply 400 described in the first to fourth embodiments performs an operation for a light load state. Further, when the image forming apparatus operates in the power saving mode, it is possible to reduce the oscillating frequency f in a light load state by the structure described in the first to fourth embodiments. In addition, when the power supply of the third embodiment is mounted in the image forming apparatus, it is possible to prevent the oscillating frequency f of the power supply from becoming too low resulting in oscillation in an audible range for human ears in a heavy load state of a normal mode in which image forming operation is performed. Further, when the power supply of the fourth embodiment is mounted in the image forming apparatus, it is possible to set the oscillating frequency f of the power supply to an arbitrary value that does not interfere with the drive frequency for forming a latent image.

As described above, according to this embodiment, it is possible to reduce the oscillating frequency in a light load state of the power supply that is mounted in the image forming apparatus, to thereby reduce the noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006418, filed Jan. 17, 2013, which is hereby incorporated by reference herein in its entirety.

What is claimed is:

1. A power supply comprising:
   a transformer having a primary side and a secondary side which are insulated with each other;
   a first switching element configured to perform a switching operation of switching between an ON state in which a voltage is supplied to the primary side of the transformer and an OFF state in which the voltage is prevented from being supplied to the primary side of the transformer;
   a second switching element connected to the secondary side of the transformer, configured to switch between the ON state and the OFF state wherein the second switching element is turned off in a case where the first switching element is turned on, and turned on in a case where the first switching element is turned off; and
   a control unit configured to control the switching frequency of the first switching element so that an output voltage of the secondary side of the transformer becomes a predetermined voltage; and
   a delay unit configured to delay a timing to turn off the second switching element off by a signal output from the control unit so that a period when the second switching element is turned on in a low load condition is longer than a period when the second switching element is turned on in a normal load condition, wherein a current supplied to the load from the secondary side of the transformer in the low load condition is smaller than a current supplied to the load from the secondary side of the transformer in the normal load condition.

2. A power supply according to claim 1, wherein an adjustment unit determines the timing in accordance with a voltage output from the control unit.

3. A power supply according to claim 2, wherein the adjustment unit comprises a capacitor which is charged to have a potential corresponding to the voltage output from the control unit.

4. A power supply according to claim 3, further comprising an operation starting unit for starting an operation of the adjustment unit when the voltage output from the control unit becomes a predetermined value or higher.

5. A power supply according to claim 2, further comprising an operation starting unit for starting an operation of the adjustment unit when the voltage output from the control unit becomes a predetermined value or higher.

6. A power supply according to claim 5, wherein the operation starting unit comprises a zener diode connected between the control unit and the adjustment unit.

7. A power supply according to claim 2, wherein the adjustment unit comprises an operational amplifier.

8. A power supply according to claim 2, wherein the adjustment unit comprises a one-shot multi-vibrator circuit.

9. A power supply according to claim 1, wherein the control unit comprises an operational amplifier.

10. An image forming apparatus, comprising:
an image forming unit for forming an image on a recording material; and
a power supply for supplying power for an operation of the image forming unit,
wherein the power supply includes:
a transformer having a primary side and a secondary side which are insulated with each other;
a first switching element configured to perform a switching operation of switching between an ON state in which a voltage is supplied to the primary side of the transformer and an OFF state in which the voltage is prevented from being supplied to the primary side of the transformer;
a second switching element connected to the secondary side of the transformer configured to switch the second switching between an ON state and an OFF state wherein the second switching element is turned off in a case where the first switching element is turned on, and turned on in a case where the first switching element is turned off;
a control unit configured to control the switching frequency of the first switching element so that an output voltage of the secondary side of the transformer becomes a predetermined voltage; and
a delay unit configured to delay a timing to turn off the second switching element off by a signal output from the control unit so that a period when the second switching element is turned on in a low load condition is longer than a period when the second switching element is turned on in a normal load condition, wherein a current supplied to the load from the secondary side of the transformer in the low load condition is smaller than a current supplied to the load from the secondary side of the transformer in the normal load condition.

11. An image forming apparatus according to claim 10, wherein the adjustment unit determines the timing in accordance with a voltage output from the control unit.

12. An image forming apparatus according to claim 10, further comprising a controller for controlling the image forming unit,
wherein the power supply supplies the power to the controller.

13. An image forming apparatus according to claim 12, wherein the controller outputs a signal for determining the timing to the adjustment unit.

* * * * *